United States Patent

[11] 3,610,683

| [72] | Inventor | Theodorus Hendricus Vermeulen<br>Heemstede, Netherlands |
|---|---|---|
| [21] | Appl. No. | 854,109 |
| [22] | Filed | Aug. 29, 1969 |
| [45] | Patented | Oct. 5, 1971 |
| [73] | Assignee | Vermeulen-Hollandia N.V.<br>Haarlem, Netherlands |
| [32] | Priority | Sept. 6, 1968 |
| [33] | | Netherlands |
| [31] | | 6,812,803 |

[54] ELECTRICALLY OPERATED SLIDING ROOF FOR A VEHICLE
12 Claims, 9 Drawing Figs.

[52] U.S. Cl. .................................................... 296/137 E
[51] Int. Cl. ..................................................... B60j 7/10
[50] Field of Search ........................................ 296/137 E, 137 G

[56] References Cited
UNITED STATES PATENTS
2,973,991  3/1961  Werner .................. 296/137 G
3,055,701  9/1962  Golde et al. .................. 296/137 G

*Primary Examiner*—Benjamin Hersh
*Assistant Examiner*—Robert R. Song
*Attorney*—Waters, Roditi, Schwartz & Nissen ABSTRACT: An electrically operated sliding roof arrangement is disclosed for a vehicle and comprises a nut fitted to the sliding panel near the rear end thereof and engages a screw spindle adapted to be driven by an electric motor. This screw spindle is mainly positioned behind the opening in the roof and extends in the direction of displacement of the sliding panel. The screw spindle is displaceable with respect to the roof between a front end position and a rear end position, while a spring exerts a forward pressure on the screw spindle, so that the screw spindle is in its front end position if no external opposing forces are exerted on the sliding panel. If the sliding panel encounters an obstacle during displacement towards its closed position, the screw spindle moves from its front end position towards its rear end position and operates a switch. This switch may switch off the electromotor or may reverse the direction of rotation of the electromotor.

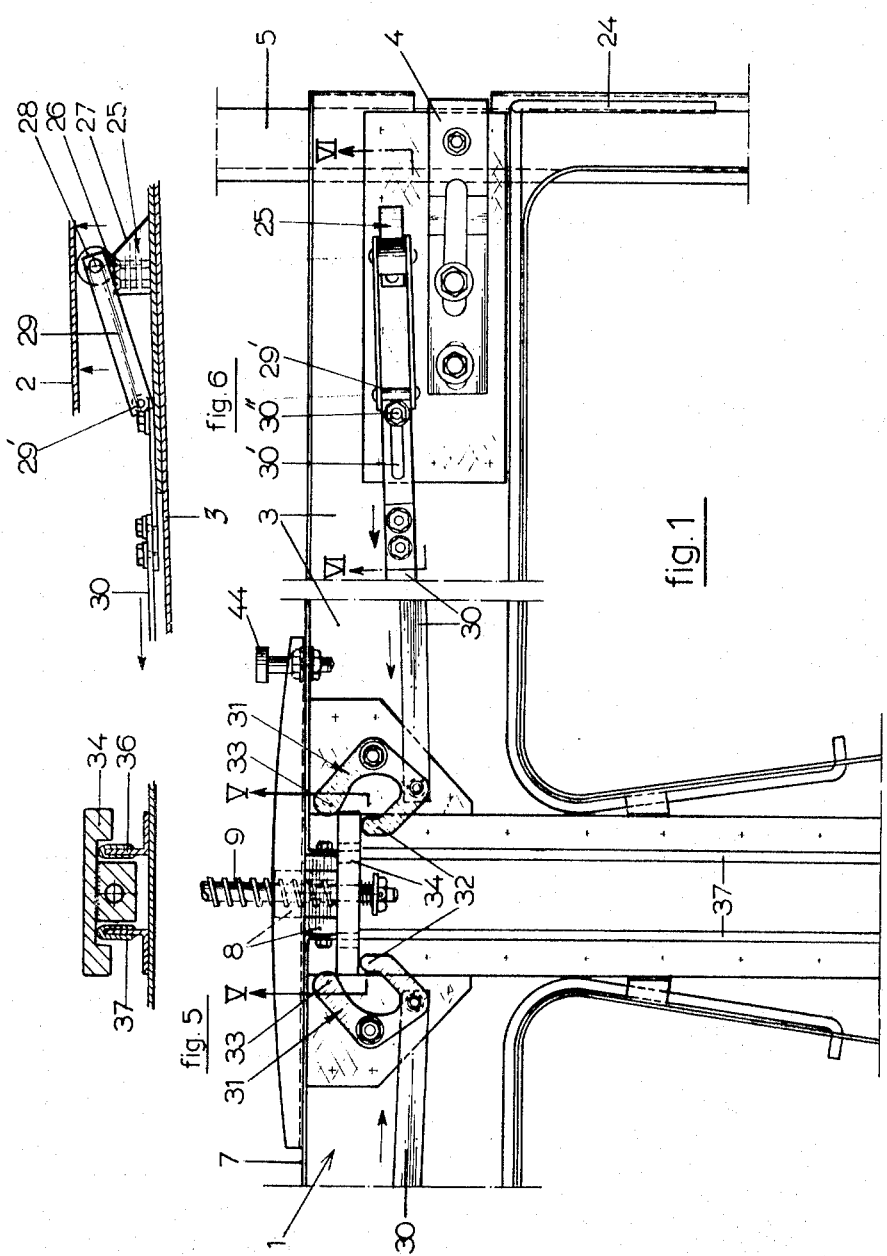

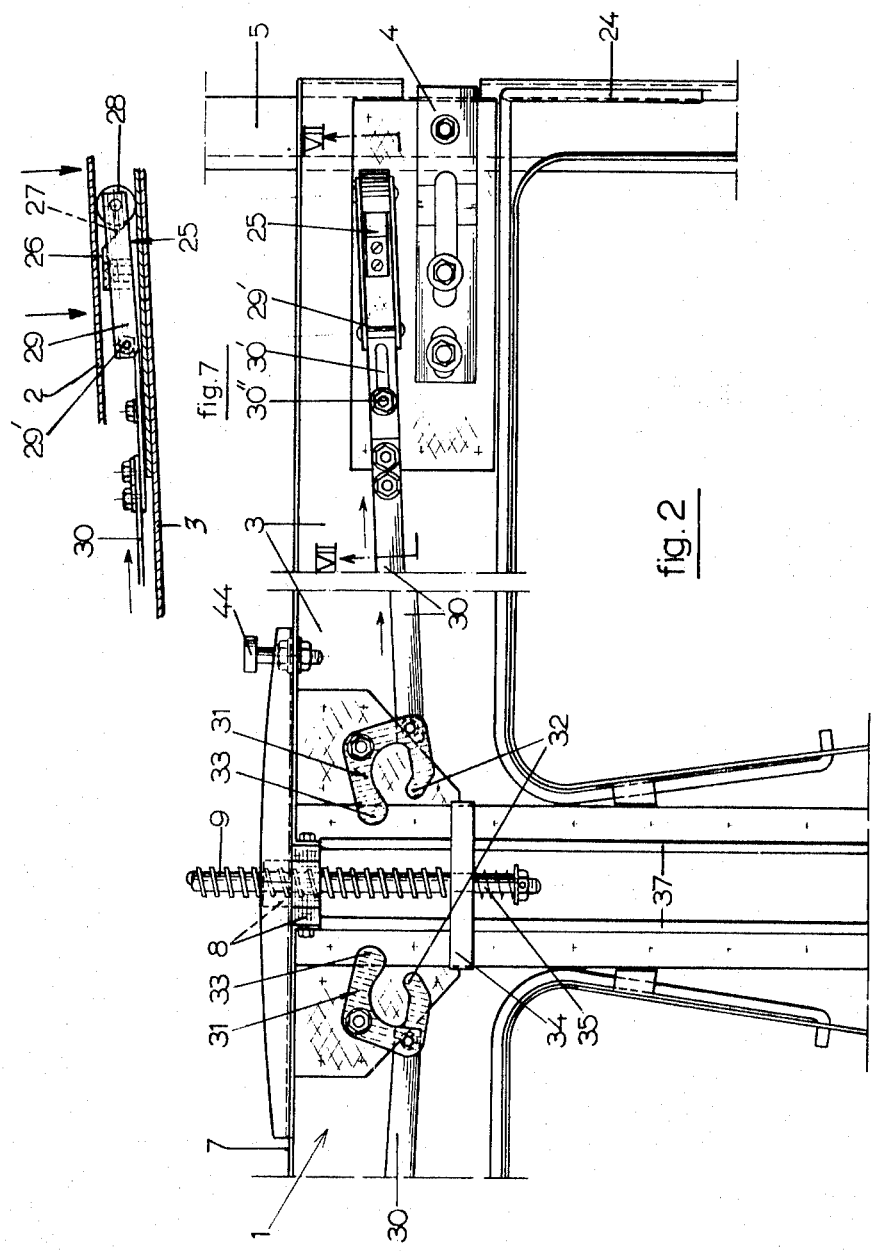

ELECTRICALLY OPERATED SLIDING ROOF FOR A VEHICLE

BACKGROUND OF THE INVENTION

The invention relates to a sliding roof arrangement for a vehicle, in particular a motor car, comprising a sliding panel cooperating with an opening in the roof of the vehicle and displaceable between a closed position and an open position by means of an operating mechanism driven by a reversible electromotor, and a safety device operative when the sliding panel meets an obstacle on its way to the closed position.

In a known embodiment of an electrically operated sliding roof arrangement of the above type, the electromotor is connected via a slip coupling to a gear box which may actuate a cable slidably mounted in a sleeve and connected to the sliding panel for displacement of the same from its closed position to a completely or partly open position, and vice versa. The slip coupling becomes operative when the sliding panel reaches the closed position or when an obstacle is encountered, in the course of its displacement towards the closed position, thus preventing further displacement of the sliding panel.

In this manner an object, such as a part of the human body, protruding through the opening in the roof, is prevented from being seriously injured by the sliding panel.

However, this known embodiment has the disadvantage, that the slip coupling may wear to such extent that slip occurs even during the normal displacement of the sliding panel.

SUMMARY OF THE INVENTION

It is an object of the present invention to provide an electrically operated sliding roof arrangement for a vehicle, wherein a continued movement of the sliding panel towards the closed position is prevented when an obstacle is encountered but wherein the use of a slip coupling is avoided.

According to the invention, the electrically operated sliding roof is characterized in that the electromotor is coupled with a screw spindle, of which a major part lies behind the roof opening, and which extends in the direction of displacement of the sliding panel, engages a nut attached to the sliding panel, and is displaceable with respect to the roof between a front end position in which it is held by the forward pressure of a spring as long as no external opposing forces are exerted on the sliding panel, and a rear end position to which it is displaced against the action of said spring if the sliding panel meets an obstacle on its way to the closed position and in which it operates a safety switch.

The safety switch, actuated by the screw spindle may serve to switch off the electromotor; in this case, the screw spindle may also actuate this switch when the sliding panel reaches the closed position. In this manner, the sliding panel immediately stops when an obstacle is encountered. In order to release this obstacle, the electromotor has to be switched on again in such a way that the sliding panel is displaced towards the open position.

As an alternative, the safety switch may serve to reverse the electromotor, and a second switch serving to disconnect the electromotor is actuated by the sliding panel when the same has reached the position, but before the screw spindle has reached the position in which it actuates the safety switch. In this embodiment the direction of motion of the sliding panel is reversed at once if the panel encounters an obstacle in the course of its displacement towards the closed position.

In the two embodiments described above, a further switch serving to disconnect the electromotor may be actuated by the sliding panel when the same reaches its completely open position.

A preferred embodiment of the sliding roof according to the invention is characterized in that the sliding panel comprises an inner frame supported in guides carried by the vehicle, an upper panel connected with the inner frame along its front side only and subjected near its rear end to a downward force exerted by at least one torsion spring, and a lifting mechanism operative in the closed position of the sliding panel to support the rear portion of the upper panel at a distance above the inner frame against the action of said torsion spring, while the screw spindle carries an operating member which renders the lifting mechanism inoperative when the sliding panel leaves its closed position, whereby the upper panel is turned downward by about its front connection with the inner frame, and which restores the operation of the lifting mechanism during the final portion of the closing movement of the sliding panel, whereby the upper panel is returned to its initial position.

In this manner it is achieved that the upper surface of the sliding panel in its closed position is flush with the upper surface of the roof, but that the sliding panel can nevertheless pass below the roof immediately after it leaves its closed position.

The lifting mechanism may comprise two cams carried by the inner frame each on one side thereof, each having an upper horizontal supporting surface passing into a downwardly inclined guide face and each cooperating with an associated roller, two levers mounted on the inner frame and pivotable about vertical axes, each connected by means of an associated rod assembly with one of the rollers and each comprising two arcuate arms alternately engaged by the operating member on the screw spindle, in such manner that the rollers rest on the supporting surfaces on the cams in the closed position of the sliding panel whereby the upper panel is held in its initial position, and that the operating member turns the two levers each by one of their arms when the sliding panel leaves its closed position whereby the rod assemblies move the rollers downward from the supporting surfaces of the cams along the guide faces, and turn the levers back by their other arms during the final portion of the closing movement of the sliding panel whereby the rod assemblies return the rollers along the guide faces to the supporting surfaces of the cams.

BRIEF DESCRIPTION OF THE DRAWING

The invention will be further explained with reference to the drawing, which represents an embodiment of an electrically operated sliding roof according to the invention and wherein:

FIG. 1 is a partial top view of an embodiment of the sliding panel of the sliding roof in the closed position, wherein the upper panel has been removed.

FIG. 2 is a top view corresponding to FIG. 1, but wherein the sliding panel is in a slightly opened position.

FIG. 5 is a section along line V—V in FIG. 1.

FIG. 6 is a section along line VI—VI in FIG. 1.

FIG. 7 is a section along line VII—VII in FIG. 2.

DESCRIPTION OF THE PREFERRED EMBODIMENT

Figure 4:
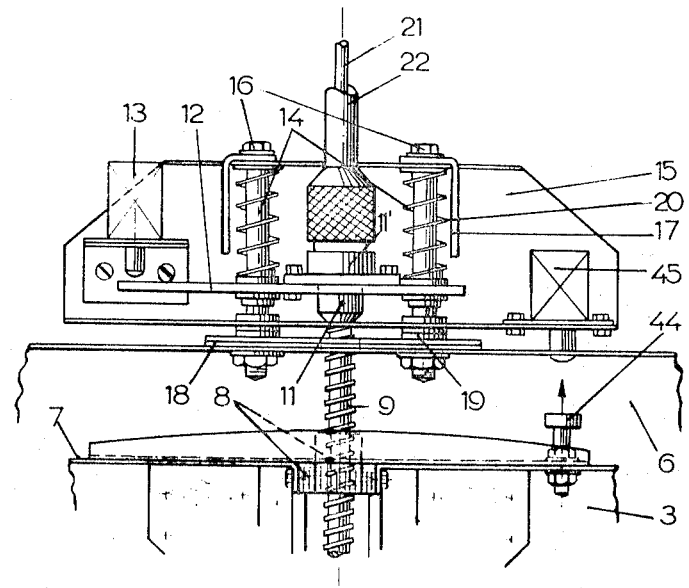
FIG. 4 is a top view corresponding to FIG. 3, but wherein the electrical operating mechanism is in a different position.

The electrically operated sliding roof for a vehicle, in particular a motor car, as shown in the drawing, comprises a sliding panel 1 which, in its front or closed position, closes an opening in the roof and which is composed of an upper panel 2 and an inner frame 3.

The upper panel 2 and the inner frame 3 are detachably connected to each other at their front sides only. The inner frame 3 is equipped on both sides with runners 4 cooperating with guide rails 5 extending on either side of the sliding panel 1 approximately horizontally in the longitudinal direction of the vehicle. The guide rails 5 are attached to a frame 6 (FIG. 3), which is laterally connected to the body of the vehicle and which is furthermore attached to the roof.

The inner frame 3 bears a nut 8 near its rear edge 7. This nut 8 engages a screw spindle 9, of which a major part lies behind the opening in the roof and which extends in the direction of displacement of the sliding panel 1. The screw spindle 9 may be driven by a reversible electromotor 10.

Figure 3:
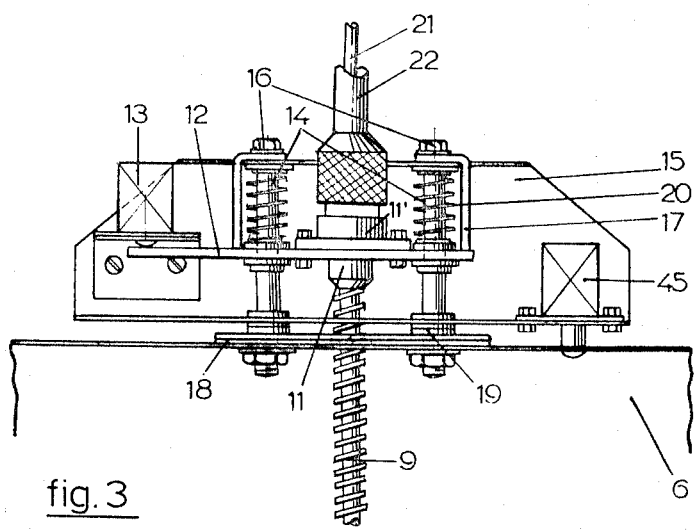
FIG. 3 is a top view of the electrical operating mechanism of the sliding panel on a larger scale.

The screw spindle 9 is displaceable with respect to the roof between a front end position (FIG. 4) and a rear end position (FIG. 3). For this purpose, the rear end of the screw spindle 9 is connected to a coupling member 11 which is rotatably connected to a housing 11' fitted to a switchplate 12. This switchplate 12 operates a switch 13 and is displaceable along two guide rods 14 parallel to the screw spindle 9. The guide rods 14 are passed through holes in two raised flanges of a mounting section 15 and attach the mounting section 15 to the frame 6. Tap bolts 16 are screwed into the rear end of the guide rods 14 and each rest via an interposed fastening lip of an angular stop 17 against the rear flange of the mounting section 15. The guide rods 14 have a threaded front portion, which engages a nut resting against the raised rear flange of the frame 6. Stiffening strips 18 having holes passed by the guide rods 14, and spacer rings 19 on the guide rods 14 extend between the adjacent raised flanges of the frame 6 and of the mounting section 15.

Two pressure springs 20 confined between the raised rear flange of the mounting section 15 and the rear side of the switch plate 12 exert a forward pressure on the screw spindle 9. If no external opposing forces are exerted on the sliding panel 1, this spring pressure maintains the screw spindle 9 in its front end position represented in FIG. 4.

The screw spindle 9 is detachably connected to the internal shaft 21 of a flexible shaft 22, which is screwed to the housing 11'. The internal shaft 21 is driven by the electromotor 10 via a reduction gear unit. The electromotor 10 is supplied by the vehicle battery 23 and may be accommodated in any suitable place in the vehicle.

Two torsion springs 24 carried by the inner frame 3 exert a downward force on the upper panel 2, near the rear side thereof. When the sliding panel 1 is closed, the upper panel 2 is maintained in its highest position, wherein the upper surface of the sliding panel 1 is flush with the upper surface of the roof. For this purpose, the inner frame 3 carries a cam 25 on either side. The cams 25 each have a horizontal upper supporting surface 26 which passes into a downwardly inclined guide face 27. Each cam 25 cooperates with a roller 28 which is journaled in a bifurcated member 29. Each bifurcated member 29 is pivotally connected to a sliding rod 30 by means of a horizontal shaft 29'. Each sliding rod 30 is slidably supported by the inner frame 3 and has a slot 30' through which a bolt 30'', fixed on the inner frame 3, projects upwards. Each sliding rod 30 is connected to a lever 31 that is journaled on the inner frame 3 and that may pivot about a vertical axis. Each lever 31 consists of two arcuate arms 32 and 33. The arms 32, 33 may alternately cooperate with a bridge member 34, which is slidably mounted on a smooth front portion of the inner screw spindle 9 and which is urged backwards by a spring 35 resting against a nut on the front portion of the screw spindle 9. The bridge member 34 may slide over two guide ribs 36 (FIG. 5) parallel to the screw spindle 9. The guide ribs 36 each consist of the upright leg of an angle section spot-welded to the inner frame 3 and covered with a plastic coating 37 having a reversed U-shape.

In the closed position of the sliding panel 1 as shown in FIG. 1 each roller 28 rests upon the end portion of the upper supporting surface 26 adjacent the inclined guide face 27 of the cooperating cam 25 and keeps the upper panel 2 in its highest position flush with the roof. When the sliding panel 1 leaves its closed position, the bridge member 34 detens the arms 32 of the two levers 31 and these levers 31 are accordingly turned in such a way that the sliding rods 30 and the bifurcated members 29 connected thereto almost immediately displace the rollers 28 downwardly from the upper supporting surface 26 of the cooperating cams 25 along the adjoining inclined guide face 27, so that the upper panel 2 swings down about its front connection with the inner frame 3 under the action of the torsion springs 24, and may be displaced in the rearward direction below the roof together with the inner frame 3.

Conversely, the bridge member 34 engages the arms 33 of the two levers 31 during the final portion of the closing movement of the sliding panel 1 whereupon the levers 31 are turned back and the sliding rods 30 are displaced until the shaft 29' strikes the head of the bolt 30''. By then the rollers 38 have returned via the corresponding inclined guide face 27 to the end portion of the upper supporting surface 26 adjacent the guide face 27 of the cams 25, and the upper panel 2 is returned to its highest position against the opposing spring force exerted by the torsion springs 24. When the shafts 29' have struck the heads of the associated bolts 30'', no further rotation of the levers 31 is possible, and the bridge member 34 will be displaced along the smooth front portion of the screw spindle 9 against the pressure of the spring 35.

Figure 8:
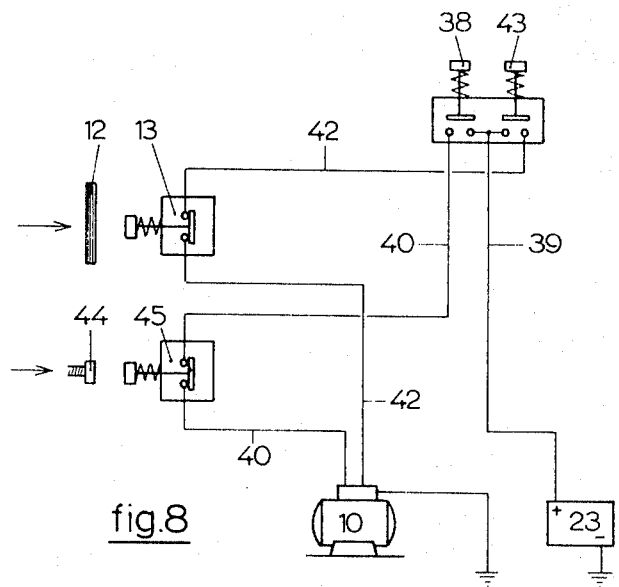
FIG. 8 is a first embodiment of the electric circuit of the operating mechanism of the sliding panel.

FIG. 8 shows a first embodiment of the electric circuit for the operation of the sliding roof arrangement described hereinabove. If the sliding panel 1 is in its closed position as represented in FIG. 1 and is to be displaced to a fully or partially opened position, an actuating pushbutton 38, preferably mounted on the dashboard, is manually depressed and connects the battery 23 to the electromotor 10 via the wires 39 and 40. The electromotor 10 will then drive the screw spindle 9 via the inner shaft 21 of the flexible shaft 22, whereby the screw spindle 9 is screwed in the nut 8. At first, the sliding panel 1 is not yet displaced and only the screw spindle 9 is moved from its rear end position (FIG. 3), as determined by the stops 17, to its front end position (FIG. 4), in which the pressure springs 20 are expanded. As the screw spindle 9 carries the switchplate 12 along, the switch 13 is released and the circuit 42 connecting the pushbutton 43 for closing the sliding panel 1 with the electromotor 10 is closed. The pushbutton 43 is preferably provided likewise on the dashboard. After the screw spindle 9 has reached its front end position, the nut 8 is displaced rearwardly due to its engagement with the rotating screw spindle 9, causing the entire sliding panel 1 to be displaced in the rearward direction.

The levers 31, which are pivotally mounted on the inner frame 3, are turned in the manner described hereinabove while passing the bridge member 34, so that the rollers 28 are displaced downwardly from the supporting surface of the cams 25 and the upper panel 2 is swung down about its front connection to the inner frame 3 and is displaced rearwardly under the roof together with the inner frame 3.

If the sliding panel 1 is to be opened only partially, the pushbutton 38 for opening the sliding panel 1 is released at the moment at which the sliding panel 1 has reached the partially opened position desired, causing the electromotor 10 to be switched off.

However, if the sliding panel 1 is to be fully opened, the control pushbutton 38 for opening the sliding panel 1 remains pushed in, until a stop 44 fitted on the rear edge 7 of the inner frame 3 actuates a further switch 45 when the sliding panel 1 has reached the fully open position. This switch 45 switches off the electromotor 10, whereafter the pushbutton 38 for opening the sliding panel 1 can be released.

If the sliding panel 1 has to be partially or fully closed, the pushbutton 43 for closing the sliding panel 1 is operated, causing the electromotor 10 to be connected to the battery 23 via the wires 49, 42, in such manner that the electromotor 10 rotates in the reversed direction. The screw spindle 9 then displaces the nut 8 together with the sliding panel 1 towards the closed position.

If the sliding panel 1 is only to be partially closed, the control pushbutton 43 for closing the sliding panel 1 is released at the moment at which the sliding panel 1 has reached this partially closed position, causing the electromotor 10 to be switched off.

If the sliding panel 1 is to be fully closed, the pushbutton 43 for closing the sliding panel 1 remains pushed in for a short period of time after the sliding panel 1 has reached its closed position, thus enabling the screw spindle 9 to screw into the then stationary nut 8 so spindle the screw spindle 9 is displaced from its front end position (FIG. 4) to its rear end position (FIG. 3), causing the switchplate 12 to actuate the switch 13 which switches off the electromotor 10. The pushbutton 43 for closing the sliding panel 1 can then be released.

During the final portion of the closing movement of the sliding panel 1, the bridge member 34 engages the arm 33 of the two levers 31, causing the rollers 38 to resume their position on the upper supporting surface 26 of the cams 25 and the upper panel 2 to swing back to its highest position.

If the sliding panel 1 encounters an obstacle, such as a body of one of the passengers, during its displacement towards the closed position the nut 8 will be stopped and the screw spindle 9 will at once screw into the nut 8 from its front end position to its rear end position, causing the switchplate 12 to actuate the switch 13, so that the electromotor 10 is switched off. The pushbutton 38 for opening the sliding panel 1 will then have to be actuated, whereafter the sliding panel 1 is displaced rearwardly so as to release the obstacle.

Thus, a particularly efficient protection is provided against accidents, as well as against damage to the sliding panel 1 or to the electromotor 10.

Figure 9:
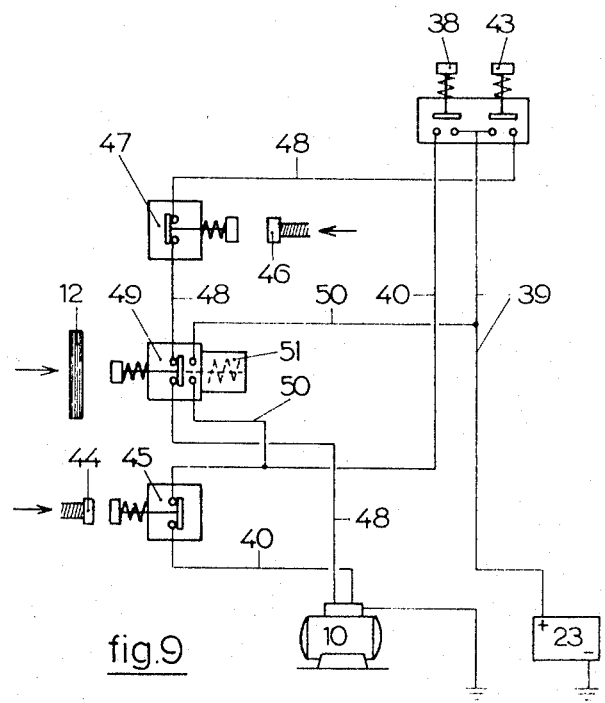
FIG. 9 is a modified embodiment of the electric circuit of the operating mechanism of the sliding panel.

FIG. 9 shows a slightly modified embodiment of the electric circuit for operating the sliding roof according to the invention.

In this embodiment, the sliding panel 1 carries an additional stop 46 at its front edge, which, when the sliding panel 1 has reached the closed position, actuates a switch 47 in the circuit 48 between the pushbutton 43 for closing the sliding panel 1 and the electromotor 10, causing the electromotor 10 to be switched off. Thus, in this embodiment, the electromotor 10 is not switched off by the screw spindle 9 anymore when the closed position of the sliding panel 1 is attained. The circuit 48 between the switch 47 and the electromotor 10 comprises a reversing switch 49. If the sliding panel 1 encounters an obstacle while being displaced towards the closed position, this switch 49 is actuated by the screw spindle 9 via the switchplate 12, after the screw spindle 9 has been displaced to its rear end position in the manner described hereinbefore. Hereupon the reversing switch 49 connects the electromotor 10 to the battery 23 via the wires 40, 50 and 39 so that the direction of rotation of the electromotor 10 is reversed and the sliding panel 1 is further opened.

The reversing switch 49 may be equipped with a timing relay 51 which returns the reversing switch 49 to its initial position after a sufficient length of time to allow the sliding panel 1 to reach the fully open position and to allow the stop 44 to actuate the switch 45, causing the electromotor 10 to be switched off.

As an alternative, the reversing switch 49 may also be returned to its initial position by means of an impulse from the switch 45 after the same has been actuated by the stop 44.

The last-mentioned embodiment of the electric circuit has the advantage that an obstacle is released almost immediately after the sliding panel 1 has come into contact therewith.

The invention is not restricted to the embodiment represented in the drawing, which may be varies in different manners within the scope of appended claims.

I claim:

1. A sliding roof arrangement for a vehicle, in particular a motor car having an opening in the roof thereof, comprising: a sliding panel cooperating with said opening and displaceable to effect a closed position and an open position of said roof opening, an operating mechanism for displacing said sliding panel, a reversible electromotor for driving said operating mechanism, and a safety device operative when the sliding panel meets an obstacle on its way to the closed position, said safety device comprising a screw spindle coupled to said electromotor, said screw spindle having a major portion thereof positioned behind the roof opening and extending in the direction of displacement of said sliding panel, a nut fastened to said sliding panel and threadably engaged with said spindle, said spindle being displaceable with respect to the roof between front end and rear end positions, a spring acting on said spindle to urge the same to its front end position in response to the forward pressure of said spring as long as no external opposing forces are exerted on the sliding panel, said spindle being movable to its rear end position against the action of said spring if the sliding panel meets an obstacle when displaced toward its closed position, and a safety switch positioned to be operatively actuated by said screw spindle when the latter is displaced to its rear position.

2. A sliding roof arrangement as claimed in claim 1, wherein said safety switch is connected in circuit to disconnect said electromotor, said switch being further actuated by said screw spindle when the sliding panel reaches its closed position.

3. A sliding roof arrangement as claimed in claim 1, wherein said safety switch is connected in circuit to reverse said electromotor, a second switch, said second switch being actuated by said sliding panel upon said panel reaching its closed position so as to disconnect said electromotor, but prior to said screw spindle reaching the position in which it actuates said first-mentioned safety switch.

4. A sliding roof arrangement as claimed in claim 1, including a further switch positioned to be actuated by said sliding panel so as to disconnect said electromotor upon said sliding panel reaching its completely open position.

5. A sliding roof arrangement as claimed in claim 1, wherein the sliding panel comprises an inner frame supported in guides carried by the vehicle, an upper panel having front and rear edges and connected with the inner frame only along its front edge, at least one torsion spring acting on the rear edge of the upper panel to exert downward force thereon, a lifting mechanism operative in the closed position of said sliding panel to support the rear portion of the upper panel at a distance above the inner frame in opposition to the force of said torsion spring, and an operating member carried by said screw spindle for rendering said lifting mechanism inoperative when said sliding panel is displaced from its closed position, the upper panel being rotated downwardly about its front connection with the inner frame, said operating member positioning the lifting mechanism into operative relationship during the final portion of the closing movement of the sliding panel, whereby the upper panel is returned to its initial position.

6. A sliding roof arrangement as claimed in claim 5, wherein the lifting mechanism comprises two cams carried by the inner frame each on one side thereof, each cam having an upper horizontal supporting surface extending into a downwardly inclined guide face, a roller adapted to cooperate with each of said cams, a pair of levers mounted on the inner frame and being each pivotable about vertical axes, a rod assembly connecting respectively each lever with one of the rollers, each lever comprising two arcuate arms alternately adapted to be engaged by the operating member on said screw spindle, so that the rollers rest on said supporting surfaces on the cams in the closed position of the sliding panel so as to maintain the upper panel in its initial position, and said operating member being adapted to rotate the two levers each by one of their respective arms when said sliding panel is displaced from its closed position, the rod assemblies being adapted to move the rollers downwardly from the supporting surfaces of the cams along the guide faces, and reversely rotate the levers through their other arms during the final portion of the closing movement of the sliding panel, whereby the rod assemblies return the rollers along the guide faces to the supporting surfaces of the cams.

7. A sliding roof arrangement as claimed in claim 5, wherein said screw spindle includes a smooth portion for slidable mounting of said operating member, said operating member being displaceable with respect to the screw spindle between two end positions, and a spring acting on said operating member to exert a rearward pressure thereon.

8. A sliding roof arrangement as claimed in claim 7, including two guide ribs, said operating member being formed as a bridge member displaceable over said guide ribs, said guide ribs being parallel to the screw spindle and fastened to the inner frame.

9. A sliding roof arrangement as claimed in claim 6, including a stop engageable by said rod assemblies during the final portion of the closing movement of the sliding panel concurrent with the rollers reaching the portion of the supporting surfaces adjoining the inclined guide faces.

10. A sliding roof arrangement as claimed in claim 4, including a coupling member, said coupling member being attached to the rear end of the screw spindle, a switch plate rotatably connected with said coupling member for actuation of the safety switch and being displaceable along two guide rods positioned in parallel relationship with the screw spindle, a mounting section supported by the roof and carrying said safety switch and further switch, said mounting section being provided with a rear stop positioned to be engaged by said switch plate in its rear end position wherein it actuates said safety switch.

11. A sliding roof arrangement as claimed in claim 10, including spring means, said spring means exerting pressure on the screw spindle through engagement with the rear face of said switch plate.

12. A sliding roof arrangement as claimed in claim 10, including a flexible shaft for connecting said coupling member with said electromotor.